(12) United States Patent
Borran et al.

(10) Patent No.: US 7,400,686 B2
(45) Date of Patent: Jul. 15, 2008

(54) APPARATUS AND METHOD FOR IMPROVED PERFORMANCE IN RADIO TELECOMMUNICATION SYSTEMS THAT USE PULSE-SHAPING FILTERS

(75) Inventors: Mohammad J Borran, Houston, TX (US); Prabodh Varshney, Coppell, TX (US); Hannu Vilpponen, Oulu (FI); Panayiotis Papadimitriou, Euless, TX (US)

(73) Assignee: Nokia Corporation, Espoo (FI)

( * ) Notice: Subject to any disclaimer, the term of this patent is extended or adjusted under 35 U.S.C. 154(b) by 826 days.

(21) Appl. No.: 10/744,351

(22) Filed: Dec. 22, 2003

(65) Prior Publication Data

US 2005/0018598 A1 Jan. 27, 2005
US 2007/0237067 A9 Oct. 11, 2007

Related U.S. Application Data

(63) Continuation of application No. PCT/US03/23135, filed on Jul. 24, 2003.

(60) Provisional application No. 60/398,418, filed on Jul. 25, 2002.

(51) Int. Cl.
    *H04L 27/00* (2006.01)
(52) U.S. Cl. .......... 375/259; 375/295; 375/316
(58) Field of Classification Search ........... 375/130, 375/259–260, 316; 370/335, 342, 203, 206
    See application file for complete search history.

(56) References Cited

U.S. PATENT DOCUMENTS

| 5,487,069 | A | 1/1996 | O'Sullivan et al. |
| 6,944,120 | B2 * | 9/2005 | Wu et al. ............... 370/208 |
| 2002/0136276 | A1 * | 9/2002 | Franceschini et al. ....... 375/148 |

* cited by examiner

*Primary Examiner*—Jean B. Corrielus
(74) *Attorney, Agent, or Firm*—Alston & Bird LLP

(57) ABSTRACT

A apparatus and method for improved performance in radio telecommunications systems, and in particular multi-carrier code division multiple access (MC-CDMA) networks that employ pulse-shaping filters on the transmit side of a radio link. In order to more accurately transmit a radio signal bearing a symbol sequence, the modulated and spread information stream is upsampled using a technique that involves inserting zeros in the frequency domain. A corresponding downsampling procedure on the receive side permits reconstruction of the transmitted symbols. A new channel estimation algorithm may also be used, and the improved channel estimation advantageously employed to obtain more faithful symbol detection.

21 Claims, 7 Drawing Sheets

APPARATUS AND METHOD FOR IMPROVED PERFORMANCE IN RADIO TELECOMMUNICATION SYSTEMS THAT USE PULSE-SHAPING FILTERS

CROSS REFERENCE TO RELATED APPLICATIONS

This Application claims priority to and is a continuation of International Application No. PCT/US03/23135, which was filed on Jul. 24, 2003 claiming priority based on U.S. Provisional Applications No. 60/398,418, filed on Jul. 25, 2002.

FIELD OF THE INVENTION

The present invention relates generally to radio telephony, and more specifically to a method and apparatus for using improved sampling and channel estimation techniques to improve the performance of wideband MC-CDMA radio telecommunication systems that use pulse-shaping filters.

BACKGROUND OF THE INVENTION

Radio telephony, generally speaking, involves the use of portable radios for telephone communication by a user through a radio telecommunication network. The network connects a large number of network subscribers with each other and, usually, with subscribers of other networks as well. Connections between calling and called parties are made using a network infrastructure that includes information channels and switching devices to route calls to the appropriate destination. Connected subscribers may engage in voice conversations or exchange text messages, email, or other forms of data.

In a radio telecommunication network, the only actual radio-frequency connection may be that between the subscribers' radios and the network infrastructure (although this is not necessarily true). Infrastructure nodes are often fixed in location and interconnected using wires, cables, or optical fibers so that they can transfer large amounts of information. The radio connection to the subscribers is important, however, because it gives them mobility. In ideal circumstances, a subscriber can make a call and maintain the connection even when traveling over dozens, or even hundreds of miles.

In order for such communications to occur, radio telecommunication networks typically employ a large number of fixed base stations spread over a wide geographic area, sometimes referred to as the network coverage area. Each base station employs one or more antennas for communicating with nearby mobile stations, and of course is also connected to the remainder of the infrastructure as well.

Figure 1:
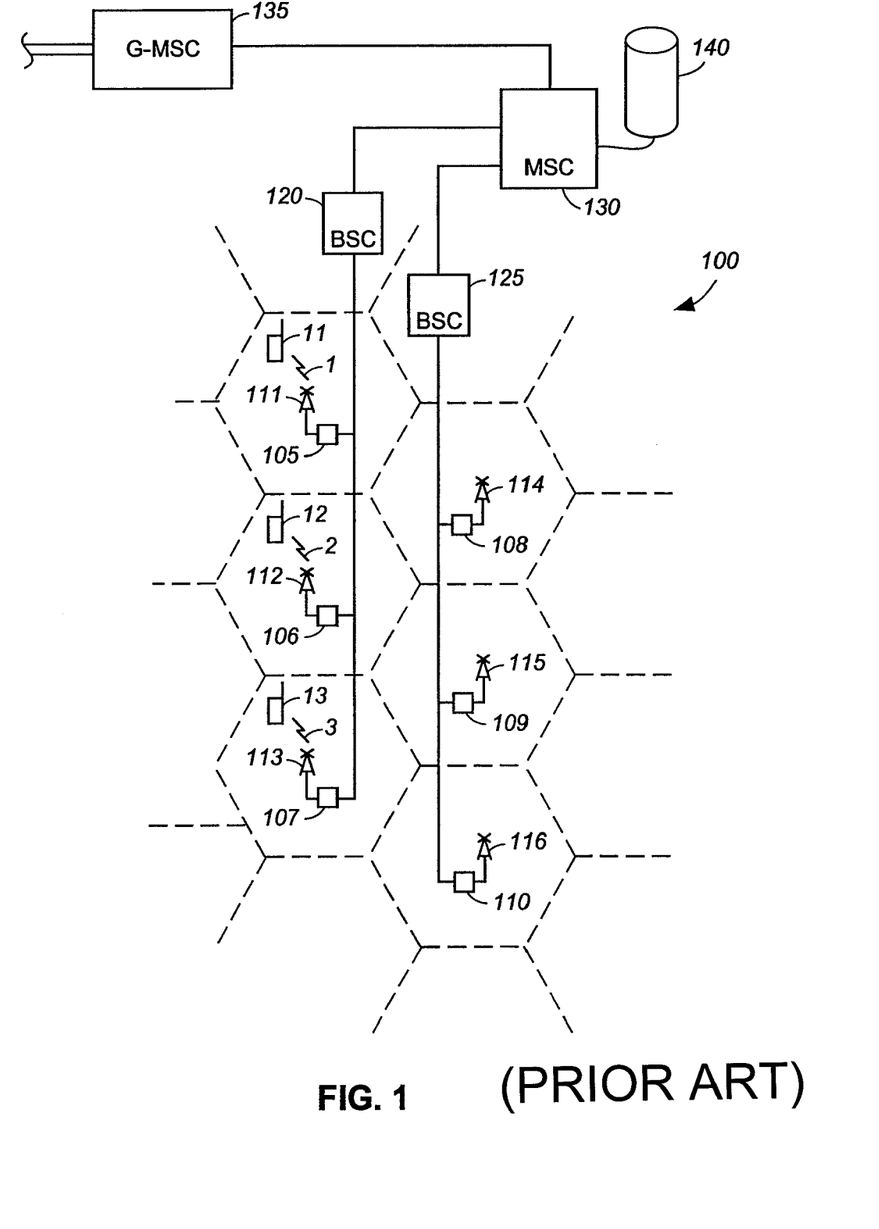
FIG. 1 is functional block diagram illustrating the relationship of selected components of a typical CDMA telecommunication network, such as one that might advantageously employ the system and method of the present invention.

FIG. 1 is a simplified block diagram illustrating selected components of a typical radio telecommunication network 100. Base stations 105-110 are each shown to be connected with an antenna 111-116. Each antenna is intended to handle communications within a selected area, sometimes referred to as a cell. (For this reason the portable subscriber radios used in such a network are often called "cellular" or simply "cell" phones.) For example, in FIG. 1 cell phones 11, 12, and 13 are shown to be in communication with antennas 111, 112, and 113, via radio channels 1, 2, and 3, respectively.

The broken lines in FIG. 1 represent cell boundaries. These boundaries do not represent the precise range of their associated antennae, of course, and are not always regular in shape or consistent in size. And although only six cells are delineated, there are typically many more in the network coverage area. Cell phones may and often do move from cell to cell, and their network communications are generally transferred from one network antenna to another though a process called handover.

Base station controllers (BSCs) 120 and 125 are in communication with, and generally control the operations of base stations 105-107 and 108-110, respectively. The base station controllers are in turn connected with a mobile switching center (MSC) 130, which handles call routing and provides a connection to other network MSCs (not shown) and gateway MSCs such as G-MSC 135, which may provide a connection to another network. A visitor location register, here VLR 140, maintains information relating to cell phones in the area services by the associated MSC. (A home location register (HLR) (not shown), may be provided to track the location and other information related to all network subscribers.)

Note that while cellular telephones have traditionally been used for voice communication, advances in technology have permitted the introduction and growing use of such instruments for other applications including sending of text messages, instant messages, data transfer, and Web surfing. Some have even incorporated functions previously performed by personal digital assistants (PDAs), such as appointment calendaring. For this reason the wide variety of such devices capable of communicating through a radio telecommunication will be referred to simply as "mobile stations".

In radio telecommunication networks, the cellular architecture provides a number of advantages. For one, in many networks channelization for individual subscriber or control communications is implemented by assigning different frequencies to each channel. By controlling the range of these communications, assigned frequencies may be reused in non-adjacent cells without creating interference between users. In addition, the close proximity of base stations with which to communicate means that mobile stations can communicate with lower transmission power than if they had to reach distant antennas. Conservation of power is, of course, an important objective of battery-operated devices.

Frequency channelization in the mobile context is frequently referred to as frequency division multiple access (FDMA). Each mobile station is assigned one or more frequencies within the overall operational bandwidth of communicating with the base station. In some systems, each communication frequency is also divided into time slots, a scheme referred to as time division multiple access (TDMA). In TDMA, each mobile station is assigned one or more of these slots and transmits a portion of its information in turn. Naturally, the slots are of sufficient duration and frequency so that each user perceives their own conversation as continuous.

Another type of multiple access scheme is called code-division multiple access (CDMA). CDMA operates somewhat differently; rather than divide the available transmission bandwidth into individual channels, many individual transmissions are spread over a frequency band using a spreading code. Transmissions intended for a particular receiver (i.e. mobile station) are spread with spreading code assigned to the mobile station, which decodes only that information intended for it and ignores the differently-coded transmissions intended for others. The number of mobile stations that can operate in a given area is therefore limited by the number of unique encoding sequences available, rather than the number of frequency bands. The operation of a CDMA network is normally performed in accordance with a protocol referred to as IS-95 (interim standard-95) or, increasingly, according to its third generation (3G) successors, such as those sometimes referred to as CDMA2000, 1xEV-DO, and 1xEV-DV, the latter of which provides for the transport of both data and voice information.

In a more recently developed scheme, the use of CDMA techniques is combined with orthogonal frequency division multiplexing (OFDM). OFDM is a modulation method in which multiple user symbols are transmitted in parallel using a large number of different sub-carriers. These sub-carriers, sometimes called frequency bins, are used to spread transmitted information with respect to frequency rather than time (as with conventional CDMA). This multiple access scheme is sometimes referred to as multi-carrier CDMA (or MC-CDMA).

Figure 2:
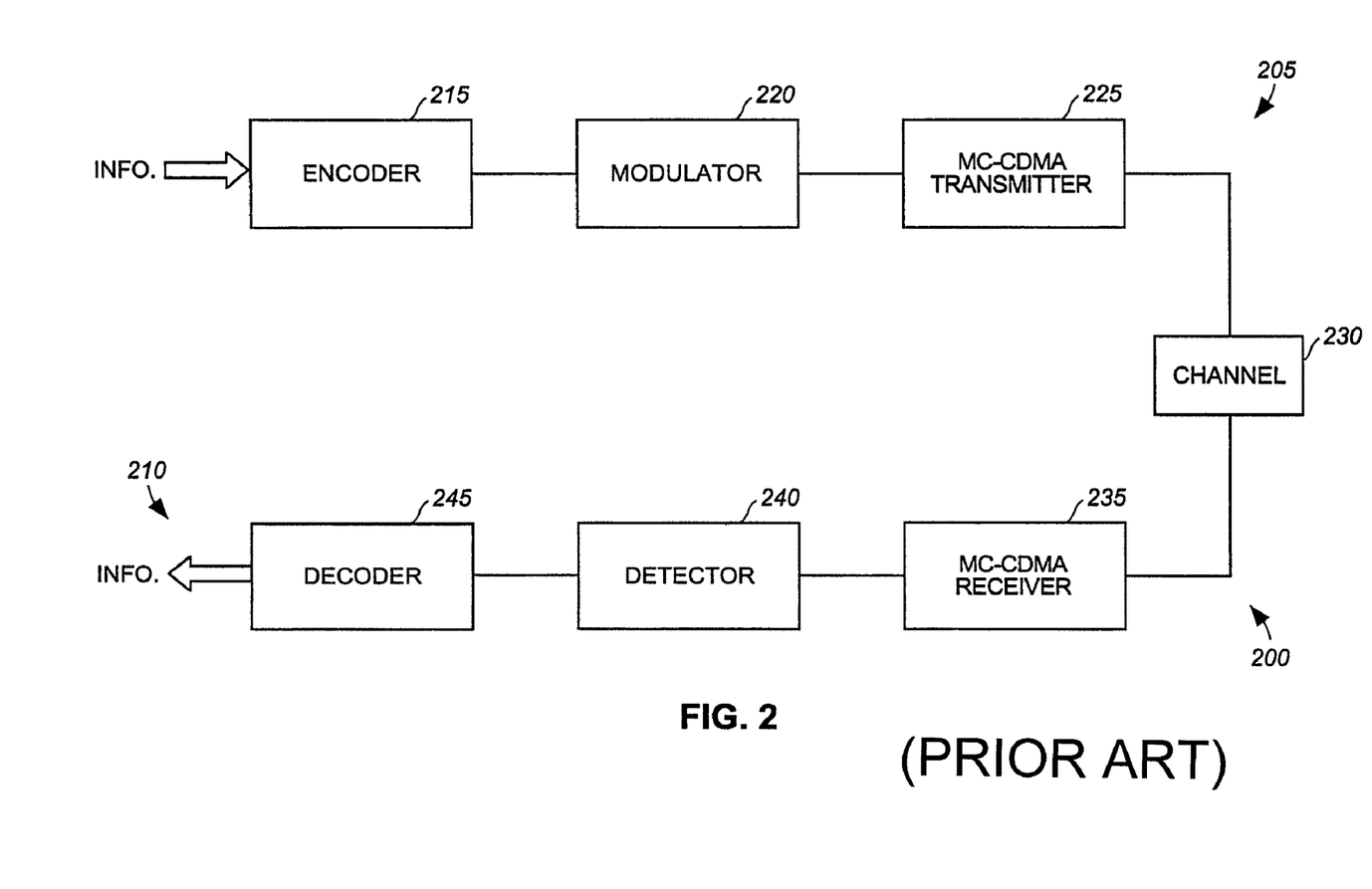
FIG. 2 is a simplified block diagram illustrating selected components of a typical MC-CDMA telecommunication system.

FIG. 2 is a simplified block diagram illustrating selected components of a typical MC-CDMA telecommunication system 200. As depicted in FIG. 2, system 200 has a transmit side 205 and a receive side 210. On the transmit side information, which may be either voice or data for transmission, is first encoded in encoder 215. The encoded information is passed to modulator 220 for modulation according to one of several modulation schemes such as QPSK or 16 QAM. The modulated symbols are then provided to an MC-CDMA transmitter 225 for transmission over an air interface radio channel 230.

The transmitted information is received on the receive side by an MC-CDMA receiver 235, which processes the information and presents it to detector 240 for symbol detection. Simply stated, detector 240 attempts to faithfully reconstruct the transmitted symbol stream by removing from the received signal the effects of any distortion or noise added in transmission. In part, these undesirable but unavoidable effects are removed, or at least mitigated, by analyzing the quality of certain received symbols called pilot symbols. These pilot symbols are not part of the transmitted user information, but are inserted into it. Their transmitted value is known to the receiver, which can estimate channel effects from the condition in which they are received. The detected symbol stream is then presented to decoder 245 for decoding. The decoded information is stored or provided to a user interface such as a speaker (not shown) so that it may be perceived by the user.

Another form of interference that may distort transmitted radio communications is referred to as inter-symbol interference (ISI). ISI arises largely from the multipath effect, a phenomenon that occurs when a propagating radio signal fans out and encounters, for example, different reflecting surfaces and propagation media creating a number of 'copies' of the same signal that may each arrive at the receiver at slightly different times. Transmit filters, such as pulse-shaping filters, that are used to limit the frequency content of the transmitted signal can also introduce ISI.

Channel equalizers in the receiver are often used to counter ISI induced by the multipath-effect. For ISI caused by the transmit filter, a matched filter may be implemented in the receiver to create an ISI-free composite filter. This approach is not always taken, however. For example, the pulse-shaping filters specified in CDMA standards such as IS-95 and 1xEv-DV are not ISI-free. As a result, the pulse-shaping filters in these systems introduce unabated ISI that degrades the ability of the receive side to accurately estimate the channel and detect the transmitted symbols.

Needed, therefore, is a way to reduce or eliminate ISI effects in MC-CDMA systems that use pulse-shaping filters in order to improve system performance. The present invention provides just such a solution.

SUMMARY OF THE INVENTION

In one aspect, the present invention is an improved apparatus for use in a radio telecommunication system including a transmitter and a receiver, the transmitter including pulse-shaping filter having a known frequency response and an orthogonal frequency division multiplexing (OFDM) modulator for taking an inverse fast Fourier transform (IFFT) of the symbol stream to be transmitted after the stream has been divided into sub-streams and zeros inserted between the sub-streams. Preferably the stream is divided into two sub-streams of equal length and the zeros are inserted as high-frequency components. The apparatus may further include a receiver to receive a transmitted radio signal, take a fast Fourier transform (FFT), and remove the previously inserted zeros. The apparatus may also apply the known pulse-shaping filter frequency response in a least squares analysis to determine a maximum likelihood estimate of the transmission channel frequency response.

In another aspect, the present invention is a receiver for receiving a time-domain signal transmitted by a MC-CDMA transmitter that upsamples a symbol stream and inserts zeros in the frequency domain before converting the symbol stream into the time domain and mapping the symbols into frequency bins for transmission, the receiver including an OFDM demodulator that removes the zeros from the symbol stream after converting it back to the frequency domain.

In yet another aspect, the present invention is a method of processing an MC-CDMA signal including the steps of encoding the information, modulating the encoded signal onto a carrier, dividing the modulated signal into a plurality of streams and spreading each stream with a spreading code, summing the spread streams into a symbol sequence of length $N_b$, dividing the symbol sequence into to a plurality of portions, inserting zeros between each separate portion, taking an IFFT of the resulting stream to obtain a time-domain signal, providing the time-domain signal to a pulse-shaping filter, and transmitting the signal. The method may further include the steps of receiving the transmitted signal and removing the previously-inserted zeros. Finally, the method may also include the step of applying the known pulse-shaping filter frequency response in a least squares analysis to determine a maximum likelihood estimate of the transmission channel frequency response, and the step of applying the channel estimate thus determined in a detector to detect the transmitted symbol stream.

BRIEF DESCRIPTION OF THE DRAWINGS

For a more complete understanding of the present invention, and the advantages thereof, reference is made to the following drawings in the detailed description below.

DETAILED DESCRIPTION

FIGS. 1 through 7, discussed herein, and the various embodiments used to describe the present invention are by way of illustration only, and should not be construed to limit the scope of the invention. Those skilled in the art will understand the principles of the present invention may be implemented in any similar radio-communication device, in addition to those specifically discussed herein.

Figure 3:
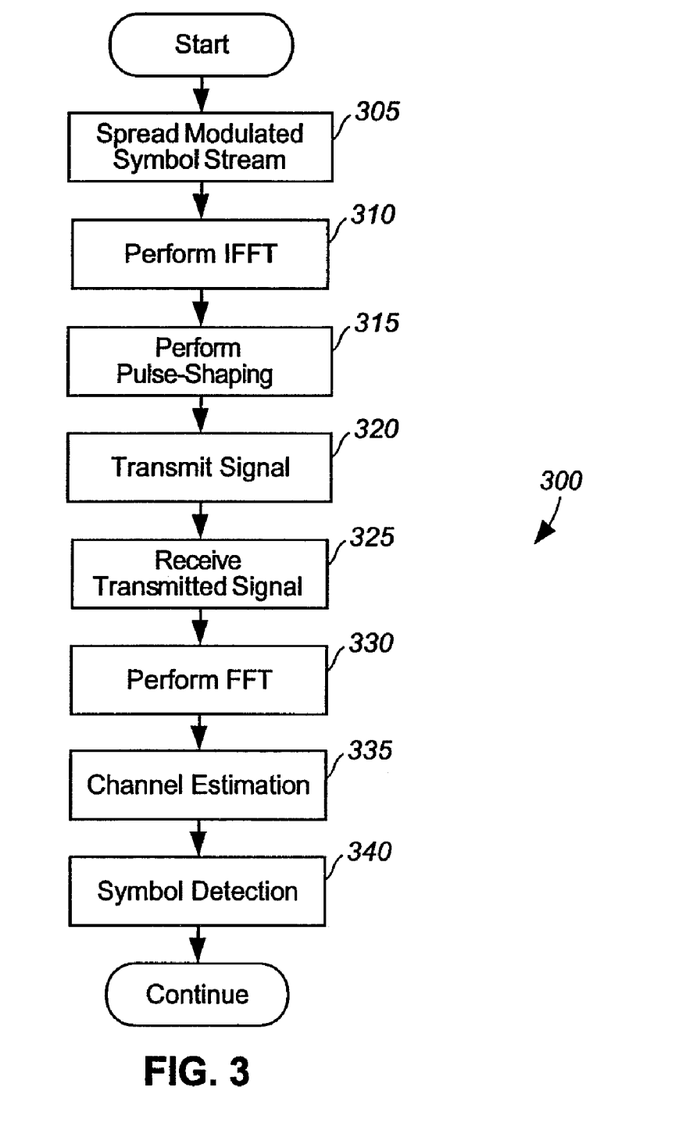
FIG. 3 is a flow diagram illustrating a method of radio transmission in an MC-CDMA radio telecommunication system.

The present invention is directed to a system and method for communication in a radio telecommunication network, and is of particular advantage when applied to a multi-carrier code division multiple access (MC-CDMA) system that includes a pulse-shaping filter on the transmit side. FIG. 3 is a flow diagram illustrating a relevant portion of the process of signal transmission in such a system. At START, it is assumed that the information to be transmitted has been encoded and modulated. The modulated symbols are then spread (step 305) using an appropriate spreading code and provided to the OFDM modulator. (While one is discussed here, there may be and often is more than one symbol stream.) The OFDM modulator converts the signal to a time-domain signal (step 310) by taking an inverse fast Fourier transform (IFFT) and provides this signal to a pulse-shaping filter. After pulse-shaping (step 315), the signal is transmitted (step 320) over an air interface.

At the receiver, the transmitted signal is received (step 325) and converted from the time domain to the frequency domain (step 330) in a demodulator applying a fast Fourier transform (FFT). A channel estimate is made (step 335), and the demodulated signal is provided to a detector for symbol detection (step 340). (Note that the timing and regularity of channel estimation may vary with system design.)

Figure 4:
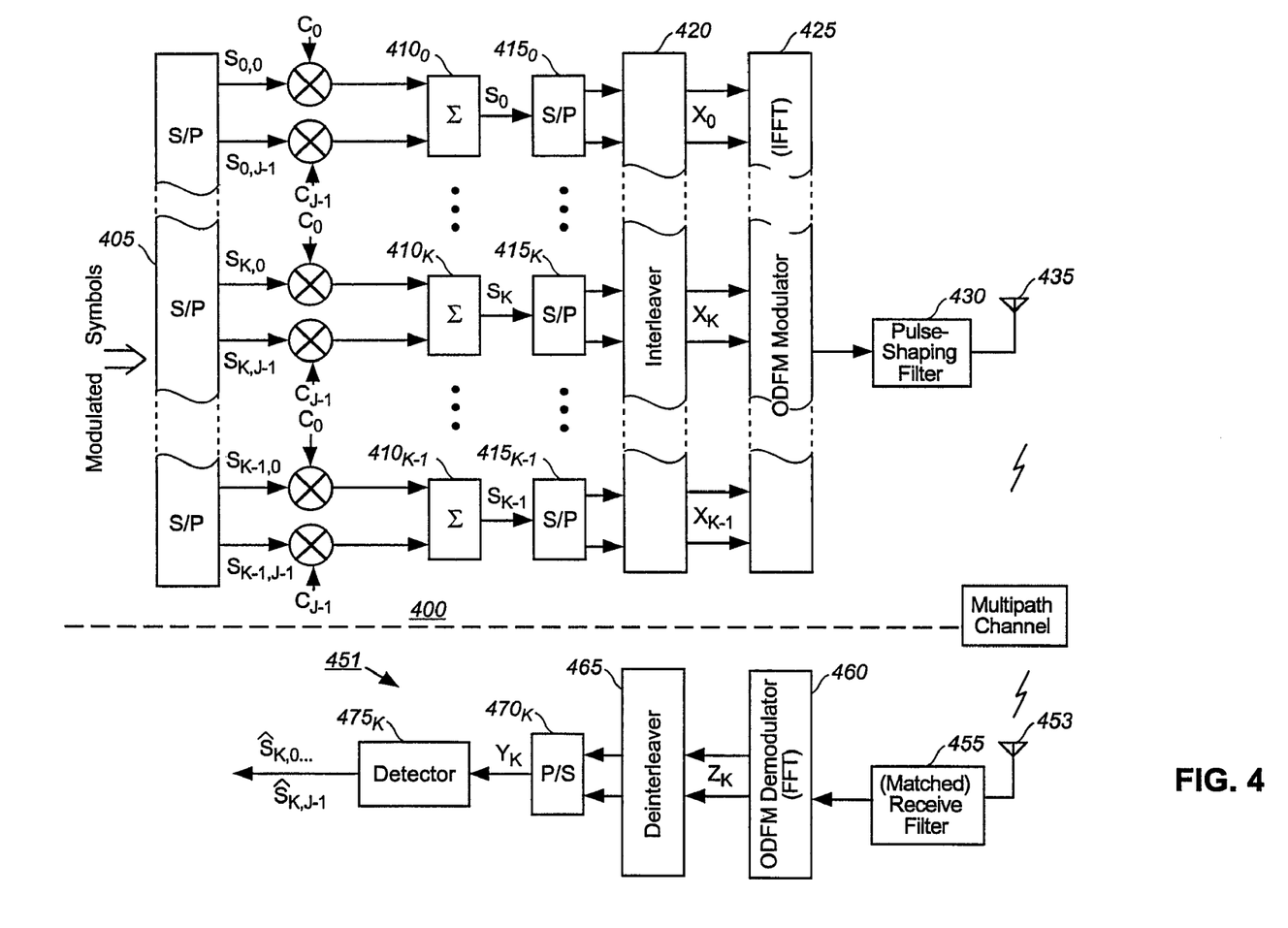
FIG. 4 is a functional block diagram illustrating selected components of a radio telecommunication system operable according to an embodiment of the present invention.

FIG. 4 is a simplified block diagram illustrating an exemplary system 400 for sending information over an air interface using MC-CDMA in accordance with an embodiment of the present invention. The portion of the Figure above the broken line represents a transmitter 401, such as one that might be found in a telecommunication network base station, and below is illustrated a receiver 451 for example one operating in a mobile station. The broken line itself represents a multi-path channel over the air interface of the radio telecommunication network.

In transmitter 401, serial-to-parallel (S/P) converter 405 splits the modulated symbol streams (of all K users) into K blocks of J streams ($s_{0,0}$ to $s_{K-1, J-1}$). Each of these streams s is spread by multiplication with a Walsh-Hadamard code ($c_0$ to $c_{J-1}$), and then presented to a summer ($410_0$ ... $410_k$ ... $410_{K-1}$), which sums the streams associated with each block 0 to K−1 into a single spread stream ($S_0$ to $S_{K-1}$). The spread streams $S_k$ are then passed through S/P converters $415_0$ ... $415_k$ ... $415_{K-1}$ before being presented to interleaver 420 for block interleaving. The output of the interleaver 420 is labeled X, which represents a symbol stream of length $N_b$. OFDM modulator (IFFT) 425 is coupled to interleaver 420 and maps the interleaved signal into frequency bins (sub-carriers), and may add a cyclic prefix.

In accordance with the present invention, prior to taking an IFFT of the symbol stream X (here $X_0$ ... $X_k$ ... $X_{K-1}$) OFDM modulator 425 first separates the stream into two streams (of length $N_b/2$ each). Between the two halves a group of $N_b$ ($N_{s-1}$) zeros at a high frequency are inserted, creating a new vector of size $N_b N_s$. This means that the IFFT will be larger (that is, of size $N_b N_s$) but the resulting time-domain signal will have the desired sampling rate $N_s$ without having modified the frequency content of the signal. The resulting time-domain signal is then passed through a pulse-shaping filter 430 and transmitted over a radio channel using antenna 435.

Receiver 451 includes the antenna 453 for receiving the transmitted radio signal. The received signal may first be passed through a matched band-pass receive filter 455 to suppress out-of-band noise and interference. Note that under certain conditions, the matched filter may be unnecessary, as discussed below. The filtered signal is then passed through an OFDM demodulator (FFT) 460 and demodulated into frequency-domain signal $Z_k$ (signals of other blocks may be present as well, but for simplicity only one is shown). In accordance with the present invention after taking the FFT (of size $N_b N_s$), the previously added high-frequency components (zeros) are removed and the two haves of the symbol stream are rejoined to form a single stream of length $N_b$. Deinterleaver 465 deinterleaves signal $Z_k$ and is coupled to parallel-to-serial (P/S) converter $470_k$, which creates a bit stream $Y_k$ (again, there may be one associated with each block, even though only one stream is shown in FIG. 4). A detector $475_k$ generates soft or hard decision outputs for each original symbol or bit stream ($\hat{s}_{k,0}$ to $\hat{s}_{K,J-1}$).

As mentioned above, the present invention involves a new upsampling and downsampling technique, the advantages of which will now be described in greater detail. In accordance with an embodiment of the present invention, the OFDM modulator 425 input vector X (see FIG. 4) is divided into two parts of equal length $N_b/2$ by inserting between them $N_b(N_s-1)$ zeros at high frequency to form a vector of length $N_b N_s$. OFDM modulator 425 then applies an IFFT of size $N_b N_s$ to obtain a time-domain signal that is then passed to pulse-shaping filter 430 for processing prior to transmission. Note that using this method the time-domain signal achieves the desired sampling rate of $N_s$ samples per chip without modifying the frequency content of the signal.

In the receiver 451, the OFDM demodulator 460 receives the time domain signal and applies an FFT of size $N_b N_s$ before removing the previously-inserted $N_b(N_s-1)$ high-frequency components. A frequency domain signal of length $N_b$ comprising the two low-frequency parts of the symbol stream may then be de-interleaved and further processed.

Note that removing the previously-inserted high-frequency components is, in effect, a lowpass filtering, and for this reason may eliminate the need for a separate receive filter (such as filter 455 shown in FIG. 4), so long as the bandwidth of the received time-domain signal is not greater than $N_s/T_c$ Hz.

Figure 5:
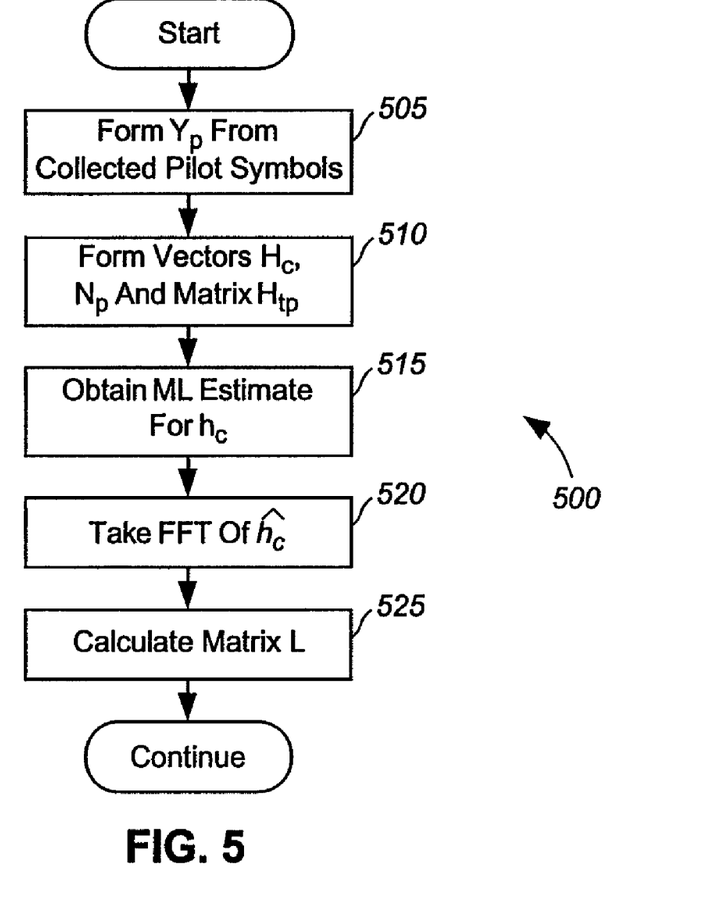
FIG. 5 is a flow diagram illustrating a method of channel estimation according to an embodiment of the present invention.

In accordance with the present invention, the performance of the receiver is also enhanced by an improved channel estimation technique. As mentioned above, channel estimation may be performed by evaluating the condition of received pilot symbols. FIG. 5 is a flow diagram illustrating a method 500 of channel estimation according to an embodiment of the present invention. At START, it is assumed that an MC-CDMA telecommunication system such as that illustrated in FIG. 4 has been provided. It is also assumed that the transmission channel is a multi-path channel of $L_c$ samples in length, and that at least $L_c$ pilot symbols have been equally spaced though the transmitted symbol stream. In this embodiment, the pilot symbols are inserted in the frequency domain.

First, the pilot symbols are collected from deinterleaved symbol stream Y to form vector $Y_p$ (step 505). In similar fashion, the vectors $H_{cp}$ and $\mathcal{N}_p$ and the matrix $H_{tp}$ are formed (step 510) from the corresponding elements of $H_c$, $\mathcal{N}$, and $H_t$ respectively (corresponding to the channel, the additive noise, and the transmit pulse-shaping filter). These are related as follows:

$$Y_p = H_{tp} H_{cp} + N_p$$

If W is a matrix consisting of the first $L_c$ columns of the OFDM demodulator FFT matrix, then $H_c$ is a diagonal matrix:

$$H_c = \text{diag}(Wh_c)$$

and if $W_p$ is a matrix considering only those rows including transmitted pilot signals:

$$H_{cp} = W_p h_c.$$

then:

$$Y_p = H_{tp} W_p h_c + N_p.$$

A maximum-likelihood (ML) value for the channel impulse response $h_c$ is then estimated (step 515). To obtain the ML estimate for $h_c$, the following log-likelihood function is maximized:

$$L(h_c) = \ln p(Y_p | h_c) = A - B \|Y_p - H_{tp} W_p h_c\|^2,$$

which since A and B are constant scalar quantities (with B>0), is equivalent to the following optimization:

$$\hat{h}_c = \underset{h_c}{\arg\min} \|Y_p - H_{tp} W_p h_c\|^2$$

This optimizing problem may be evaluated as a least squares (LS) problem using the method of singular value decomposition (SVD). If the SVD of $H_{tp} W_p$ is given by $H_{tp} W_p = USV^H$, then:

$$\hat{h}_c = VS^{-1} U^H Y_p.$$

The channel estimate according to the present invention may then be obtained by taking the FFT of $\hat{h}_c$ (step 520) as follows:

$$\hat{H}_c = \text{diag}(W\hat{h}_c) = \text{diag}(WVS^{-1}U^H Y_p).$$

Finally, since W, $H_t$, V, S, and U are known, a matrix $L = WVS^{-1}U^H$ can be calculated (step 525) and the channel estimation for each OFDM symbol may be expressed as $\hat{H}_c = \text{diag}(LY_p)$. The method of the present invention thereby advantageously applies the known transmit pulse-shaping filter frequency response.

As mentioned above, in accordance with an embodiment of the present invention the channel estimate is applied in detector 475$_k$. Having calculated the channel estimate separately, it is now combined with the (known) frequency response of the transmit pulse-shaping filter $H_t$ to form a composite channel matrix $\mathcal{N} = H_c H_t$. If the composite channel effect related to the k-th transmit block is represented as $\mathcal{N}_k$, and the corresponding additive noise is $\mathcal{N}_k$, then the input to the detector 475$_k$ may be represented as:

$$Y_k = H_k S_k + N_k.$$

From these new parameters the transmitted symbol stream may be reconstructed by application of a variety of methods, for example by applying a conventional matched-filter detector, or by using a maximum likelihood detector.

Figure 6:
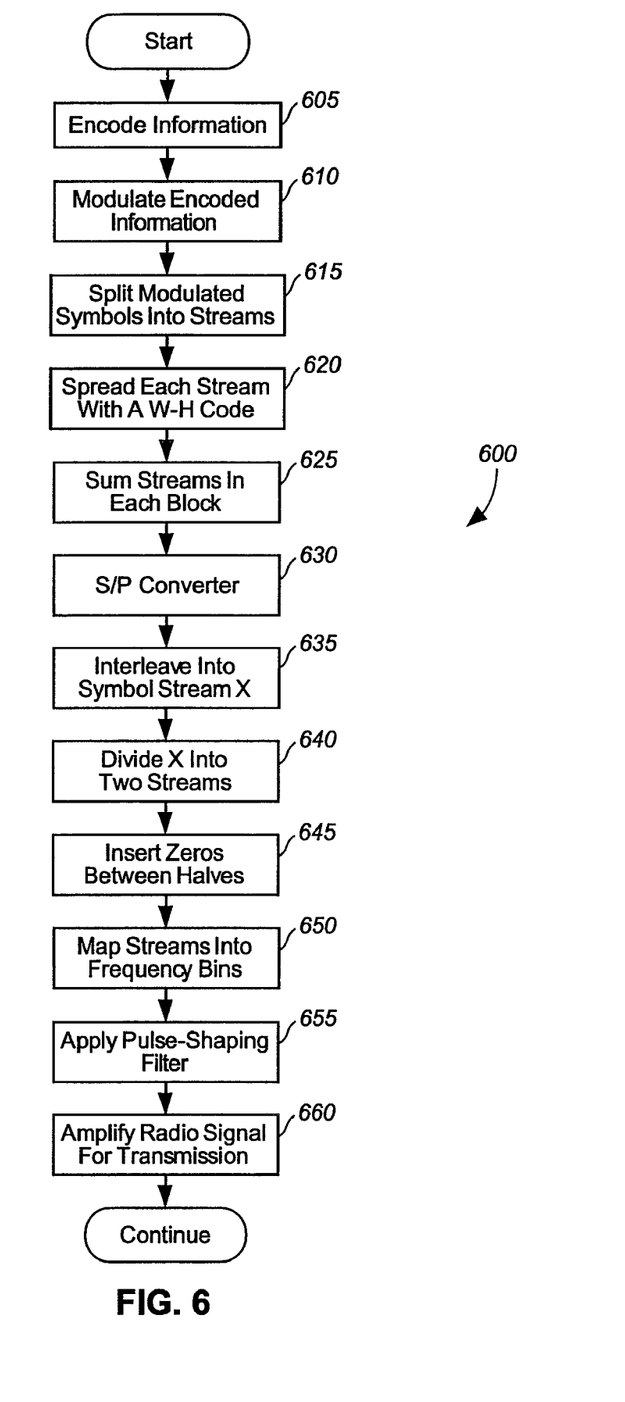
FIG. 6 is a flow diagram a method of processing and transmitting a radio signal according to an embodiment of the present invention.

FIG. 6 is a flow chart illustrating a method 600 of transmitting a radio signal according to an embodiment of the present invention. At START, it is presumed that a transmitter such as transmitter 401 shown in FIG. 4 has been provided. The method begins when information to be transmitted is encoded (step 605). The encoded information is then modulated (step 610) according to any one of several existing schemes. The modulated symbols are then divided into K blocks of J streams each (step 615). Each stream within a block is spread with a unique spreading code (step 620), generally a Walsh-Hadamard code, and summed into a single stream (step 625). This symbol stream is then re-divided into parallel paths (step 630) in a serial-to-parallel converter for interleaving (step 635) with the streams of the other blocks.

In accordance with the present invention, the interleaved output X (in this illustration $X_0$ through $X_{K-1}$) is divided into two streams (step 640) each of length $N_b/2$. Then, $N_b(N_s-1)$ zeros are inserted between the two parts (step 645), forming a new vector of length $N_b N_s$. These signals are then mapped into frequency bins (step 650) using an OFDM modulator that takes an inverse fast Fourier transform (IFFT) of size $N_b N_s$ to obtain a time-domain signal of the same length.

The result is a time-domain signal of sampling rate $N_s$ that was obtained without modifying the signal's frequency content. The time-domain signal is then presented to a pulse-shaping filter (step 655) and then transmitted (step 660) over a radio channel.

Figure 7:
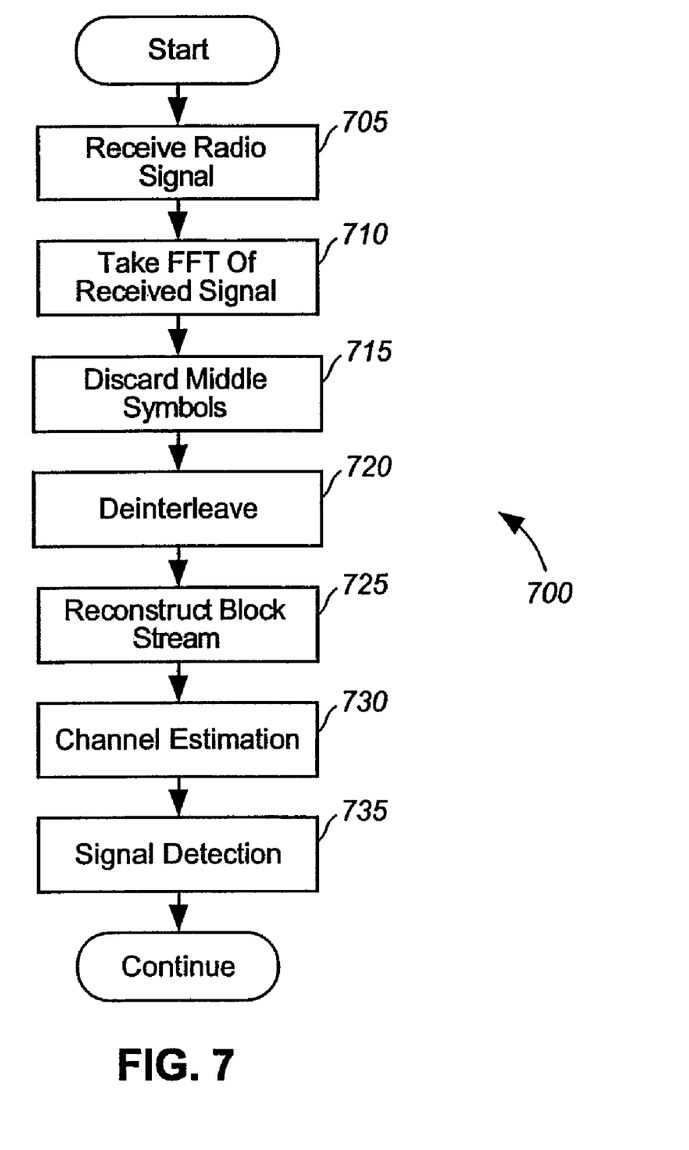
FIG. 7 is a flow diagram illustrating a method of receiving and processing a radio signal according to an embodiment of the present invention.

FIG. 7 is a flow chart illustrating a method 700 of receiving a radio signal according to an embodiment of the present invention. At START, it is presumed that a receiver such as receiver 451 shown in FIG. 4 has been provided, and that a signal according to the present invention has been transmitted. First the transmitted time-domain radio signal is received (step 705). In order to recover $N_b$ symbols at the output of the OFDM demodulator, a fast Fourier transform (FFT) of size $N_b N_s$ is applied to the received signal (step 710), converting the signal back to the frequency domain, and then the middle $N_b(N_s-1)$ high-frequency symbols are discarded (step 715).

The $N_b$ symbols output from the OFDM demodulator (represented by the vector Z in FIG. 4), are then provided to a deinterleaver for deinterleaving (step 720), and the originally transmitted blocks are reconstructed (step 725). In order to reproduce the transmitted symbol streams, a channel estimation is performed (step 730), and using the estimated channel, each block is presented to a detector for symbol detection (step 735).

The foregoing description therefore provides an improved system and method for transmitting information in a MC-CDMA telecommunication system that reduces or eliminates the ISI due to typically used (non-ideal) pulses-shaping filters in the MC-CDMA transmitters. An improved channel estimation technique is also provided, and the improved estimate is advantageously applied in symbol detection.

The preferred descriptions are of preferred examples for implementing the invention, and the scope of the invention should not necessarily be limited by this description. Rather, the scope of the present invention is defined by the following claims.

What is claimed is:

1. An apparatus comprising:
   a transmitter for transmitting a time domain signal, wherein the transmitter comprises:
   an orthogonal frequency division multiplexing (OFDM) modulator that divides a modulated information-bearing signal into a plurality of streams, spreads each of the plurality of streams with a spreading code, sums the spread streams into an input vector X of length $N_b$, divides the input vector X of length $N_b$ into two parts, inserts $N_x$ zeros between the two parts, and takes an inverse fast Fourier transform (IFFT) of size $N_bN_x$ to obtain a time-domain signal; and a pulse-shaping filter coupled to the OFDM modulator for processing the time-domain signal prior to transmission; and a receiver for receiving the transmitted time-domain signal, wherein the receiver comprises an OFDM demodulator for taking a fast Fourier transform (FFT) of size $N_bN_x$ of the received signal and removes the zeros inserted in the transmitter from the resulting frequency-domain signal.

2. The apparatus of claim 1, wherein the time-domain signal has a sampling rate of Ns samples per chip, and wherein $N_x=N_b(N_s-1)$.

3. The apparatus of claim 1, wherein the pulse-shaping filter is a raised-cosine filter.

4. The apparatus of claim 1, wherein the inserted zeros are higher frequency components than the input vector X.

5. The apparatus of claim 1, wherein the receiver further comprises a filter matched to the pulse-shaping filter of the transmitter for filtering the received signal and providing the filtered signal to the OFDM demodulator.

6. The apparatus of claim 1, wherein the transmitter further comprises: an encoder for encoding information to be transmitted; and a modulator for modulating the encoded information.

7. The apparatus of claim 1, wherein the OFDM demodulator reconstructs as output vector Z the transmitted signal by concatenating the remaining portions of the frequency-domain signal after removing the zeros.

8. The apparatus of claim 7, wherein the receiver further comprises a detector for detecting received symbols after the transmitted signal has been converted to the frequency domain.

9. The apparatus of claim 8, wherein the receiver further performs channel estimation by analyzing received pilot symbols that were inserted in the frequency domain by the transmitter.

10. The apparatus of claim 9, wherein the frequency response of the pulse-shaping filter is known, and wherein performing the channel estimation applies the known pulse-shaping filter frequency response.

11. The apparatus of claim 10, wherein the receiver performs the channel estimation using a least squares (LS) analysis.

12. The apparatus of claim 9, wherein the detector applies the channel estimation to the detection of the received symbols.

13. An apparatus comprising:

a receiver configured to receive a time domain signal, wherein the time domain signal is generated by dividing a modulated information-bearing signal into a plurality of streams, spreading each of the plurality of streams with a spreading code, summing the spread streams into an input vector X of length $N_b$, dividing the input vector X of length $N_b$ into two parts, inserting $N_x$ zeros between the two parts, and taking an inverse fast Fourier transform (IFFT) of size $N_bN_x$ to obtain the time-domain signal, said receiver comprising:

an orthogonal frequency division multiplexing (OFDM) demodulator for taking an FFT of the received time-domain signal and removing the inserted zeros.

14. The receiver of claim 13, wherein the OFDM demodulator performs a lowpass filtering operation to remove the zeros.

15. A method comprising:

dividing a modulated information-bearing signal into a plurality of streams;

spreading each of the plurality of streams with a spreading code;

summing the spread streams into a symbol sequence of length $N_b$;

dividing the symbol sequence into two portions;

inserting zeros between the two portions to generate a resulting stream;

taking an inverse fast Fourier transform (IFFT) of the resulting stream to obtain a time-domain signal;

providing the time-domain signal to a pulse-shaping filter; and transmitting the time-domain signal over a transmission channel.

16. The method of claim 15, wherein the zeros are inserted as high frequency components.

17. The method of claim 15, further comprising:

receiving the transmitted time-domain signal;

taking a fast Fourier transform (FFT) of the received time domain signal to obtain a frequency-domain signal; and removing the previously inserted zeros from the frequency-domain signal.

18. The method of claim 17, further comprising estimating the frequency response of the transmission channel.

19. The method of claim 18, wherein the transmitted time domain signal is transmitted by a transmitter having the pulse-shaping filter with a known frequency response, and wherein the estimating comprises determining a maximum likelihood estimate by solving a least squares problem that applies the known pulse-shaping filter frequency response.

20. The method of claim 18, further comprising detecting received symbols using the estimated frequency response of the transmission channel.

21. A transmitter comprising:

an orthogonal frequency division multiplexing (OFDM) modulator that divides a modulated information-bearing signal into a plurality of streams, spreads each of the plurality of streams with a spreading code, sums the spread streams into an input vector X of length Nb, divides the an input vector X of length Nb into two parts, inserts Nx zeros between the two parts, and takes an inverse fast Fourier transform (IFFT) of size NbNx to obtain a time-domain signal; and a pulse-shaping filter coupled to the OFDM modulator for processing the time-domain signal prior to transmission.

* * * * *